BEST AVAILABLE COPY

Examiner

[redacted] BCK

SAMUEL WHITAKER.

Improvement in Cases for Ribbons, Laces, &c.

RE No. 4,611. Reissued Oct. 24, 1871.

SCALE For FIG'S 1 & 2.

SCALE FOR FIG'S 3 & 4.

SCALE FOR FIG'S 5, 6, & 7.

WITNESSES:
James L. Chase
James L. Peake

INVENTOR.
Samuel Whitaker
per Charles P. Howson
HIS ATTORNEY.

AM PHOTO-LITHOG'Y 3 KEY'S BOSTON PROCESS

BEST AVAILABLE COPY

UNITED STATES PATENT OFFICE.

SAMUEL WHITAKER, OF MACON, ASSIGNOR TO HIMSELF AND AARON RUTH, OF DECATUR, ILLINOIS.

IMPROVEMENT IN CASES FOR RIBBONS, LACES, &c.

Specification forming part of Letters Patent No. 113,827, dated April 18, 1871; reissue No. 4,611, dated October 24, 1871.

*To all whom it may concern:*

Be it known that I, SAMUEL WHITAKER, of Macon, in the county of Macon and State of Illinois, have invented certain Improvements in Cases for Ribbons, Laces, &c., of which the following is a specification:

My invention relates to a case for ribbons, laces, &c., so arranged and operated that each spool may be filled separately, and that the protruding end of any coil of ribbon may be drawn so as to obtain any desired length without disturbing the other coils. A spring tape-measure is attached, so that as the ribbon is drawn out of the case it can be measured, the spring tape-measure sliding on a rod running the full length of the case.

Figure 1:
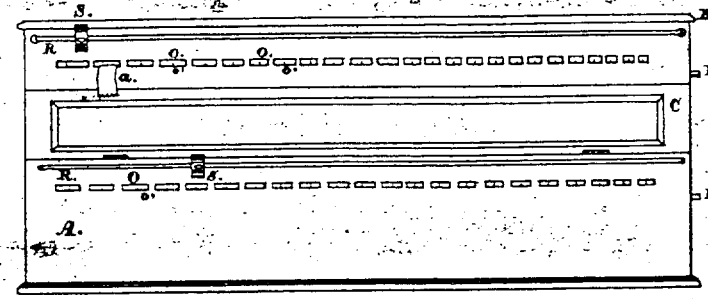
Figure 2:
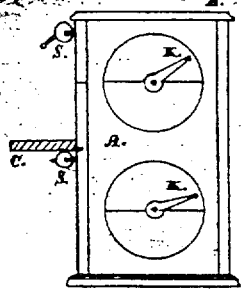
Figure 3:
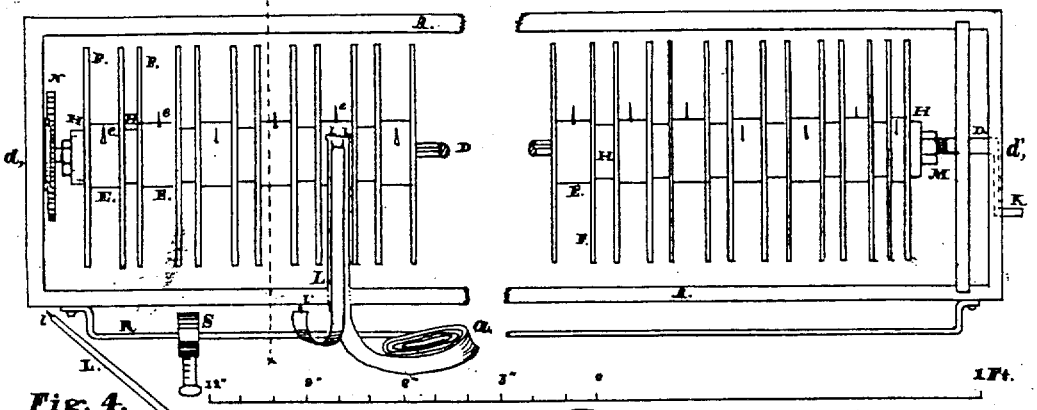
Figure 4:
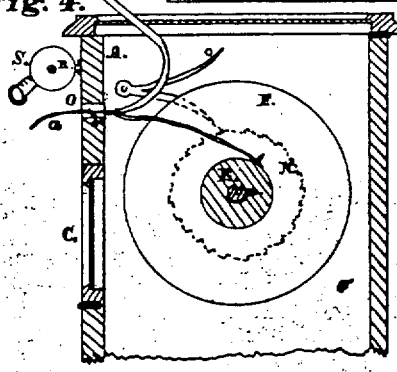
Figure 5:
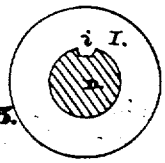
Figure 7:
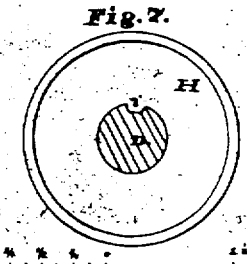
Figure 6:
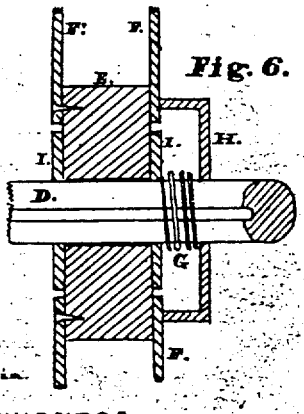

Figure 1 is a side elevation of a case embodying my invention; Fig. 2, an end view; Fig. 3, a plan; Fig. 4, a section taken through the lines *x x*, Fig. 1; Fig. 5, the washer and section, showing shaft; Fig. 6, a section showing cap, spring, and washer; and Fig. 7, a plan of cap.

A is the case, made of wood or other suitable material. B is the lid on top, and C a sash on the side of the case, by which access is had to the interior of the case. The lid and sash are provided with glass. *a a* represents the ribbon or lace. D is a shaft running the full length of the case, having bearings at *d d'*. Upon this shaft are the spools E E, these spools revolving on the shaft. The spools are provided with a point, *e*. F F are flanges to the spools. These flanges are cut out in the center, so that the washer I can be placed against the end of the spool and that the flange will not touch the washer. The inside of the washer is provided with a projection, *i*, which fits in a groove in the shaft. H is a cap that covers the spiral spring G. The inside of the cap is also provided with a projection the same as the washer. The spring is placed around the shaft, the ends resting respectively against the inside of the cap and against the washer. K is a crank by which motion is communicated to the shaft.

The machine is operated as follows, viz.: The end of the ribbon or lace is fastened to the feeder L, there being points *l l* upon it by which the ribbon is held. The ribbon is then passed between the flanges F F and fastened to the point *e*, and coiled upon the spools by turning the crank, there being sufficient pressure from the springs to hold the spools so that they will revolve with the shaft. When the spools work loose upon the shaft more pressure can be obtained by tightening them with the nut *m*. After the ribbon is all coiled upon the spool the loose end is fastened to the crooked end of the feeder L, as is shown in Fig. 4, there being a point, *l*, to catch and hold the ribbon, and the ribbon passed through the opening O in the side of the case, the end of the ribbon catching on the point *o'* in the opening, so that when other spools are being filled the ribbon shall be held, thereby holding the spool stationary, the pressure from the springs being so regulated that it will cause the spools to revolve when not held as above stated, and not so great that it will tear the ribbons loose from the points *o'* when other spools are being filled. When it is desired the ribbon is removed from the case by raising the protruding end from the point *o'* and pulling on the end of ribbon, the spool revolving on the shaft. The washers and caps, being stationary on the shaft, prevent the other spools from uncoiling. The shaft is held from a reverse movement by a ratchet-wheel and pawl, *n*.

Any number and width of spools can be put upon the shaft and the case made with any number of series of spools, &c., that is desired.

R is a rod, upon which slides a spring tape-measure, S, so arranged that the box which contains the tape-measure and spring will slide from one of the cases to the other for the purpose of measuring the ribbon, &c., as it is drawn from the case.

By this arrangement of the different parts heretofore described each spool can be revolved in either direction separately without disturbing the others; or two or more spools can be made to revolve in either direction without disturbing the others.

I claim as my invention—

1. In a case for ribbons, laces, &c., constructed, substantially as described, with a series of springs, washers, and caps on the shaft and between the spools, the washers and caps provided with projections that fit in a slot in the shaft, so that they will revolve with the shaft, and that the material can be wound upon each spool separately or upon two or more of them at the same time without disturbing the other coils, as set forth.

2. In a case for ribbons, laces, &c., constructed,

BEST AVAILABLE COPY substantially as described, with a series of springs, washers, and caps on the shaft and between the spools, the washers and caps provided with projections that fit in a slot in the shaft, and with a ratchet-wheel and pawl, so that one or more of the coils of ribbon, &c., can be uncoiled at the same time, as set forth.

3. A series of spools, E E, with the points *e e*, and a series of openings, O O, with the points *o′ o′*, substantially as described, and for the purpose set forth.

4. The feeder L, provided with the points *l l l*, for the purpose set forth.

5. The spring tape-measure S sliding in the rod R, for the purpose described.

Witnesses: SAMUEL WHITAKER.
HENRY MCCLELLAN,
JACOB I. BEAR. (62)